(12) United States Patent
Pauletti et al.

(10) Patent No.: US 6,747,498 B1
(45) Date of Patent: Jun. 8, 2004

(54) CAN RECEIVER WAKE-UP CIRCUIT

(75) Inventors: Timothy P. Pauletti, Plano, TX (US); John H. Carpenter, Jr., Rowlett, TX (US); Benjamin L. Amey, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/326,457

(22) Filed: Dec. 20, 2002

(51) Int. Cl.[7] .................................................. H03K 3/02
(52) U.S. Cl. ......................... 327/198; 327/205; 327/333
(58) Field of Search ................................. 327/142, 143, 327/198, 205, 206, 333, 376, 377, 427, 108, 112, 70, 77, 78, 80, 81

(56) References Cited

U.S. PATENT DOCUMENTS 6,407,594 B1 * 6/2002 Milazzo et al. .............. 327/112

6,600,350 B2 * 7/2003 Sekimoto et al. ............. 327/143

OTHER PUBLICATIONS

Road vehicles—Interchange of digital information—Controller area network (CAN) for high–speed communication, International Standard, First edition Nov. 15, 1993, pp. i–iv, 1–14, 16–58, vol. ISO 11898, International Organization for Standardization, Geneve, Switzerland.

* cited by examiner

Primary Examiner—Long Nguyen
(74) Attorney, Agent, or Firm—William B. Kempler; W. James Brady, III; Frederick J. Telecky, Jr.

(57) ABSTRACT

A wake-up circuit for a ECU on a CAN bus utilizes two complementary switching transistors which will turn ON when there is a differential voltage between CANH and CANL which will turn ON the transistors to pass a current which will be mirrored over to create a voltage which will switch a comparator or a Schmitt trigger. The two signals are then ORed together to generate a digital wake-up signal that can be utilized by other on-chip circuitry.

16 Claims, 2 Drawing Sheets

CAN RECEIVER WAKE-UP CIRCUIT

FIELD OF THE INVENTION

This invention relates to a wake-up circuit for a CAN receiver, and more specifically to a wake-up circuit for the physical layer of an electronic control unit (ECU) on a CAN.

BACKGROUND OF THE INVENTION

Modern vehicles have abandoned the utilization of separate wires between the various modules on the vehicle because of the sheer bulk of the number of conductors required and the cost associated therewith. The main motivation for using a CAN bus is noise immunity. It is used widely in automobiles, as well as industrial applications where the environment is harsh and levels of electrical interference are very high. These vehicles use a controller area network (CAN) in accordance with International Standard ISO 11898, entitled "Road vehicle—Interchange of digital information—Controller area network (CAN) for high-speed communication", for example.

A simplified view of a CAN network is shown in FIG. 1 generally as 100. In this simplified diagram, other components, such as terminating resistors, are omitted for simplicity. The CAN bus comprises two wires one labeled CANH and the other CANL, as is well known to those skilled in the art. FIG. 1 illustrates three modules 110, 120 and 130 on the bus. The devices are wired in parallel as illustrated with devices 110 and 120 which have lines 112, 114 and 122, 124, respectively connected to the bus. Device 130 is shown as two separate modules 132, 138 to illustrate how the module, referred to as a ECU in the International Standard, is constructed. The module comprises a physical layer 138 coupled to a processor 132. The physical layer is an analog layer which transmits signals along and receives signals from the CAN bus. Microprocessor 132 communicates with the physical layer 138 via a transmit line 134 and a receive line 136. The physical layer 138 is connected to the bus via lines 140 and 142. The detailed operation of this module is described in the International Standard and need not be described in detail here.

In order to control the power consumption of the network the ECU enters a "sleep mode" in which very little quiescent power is drawn by the module. This can occur at any point in the operation of the vehicle in which that particular module is not needed. It can also occur when the vehicle ignition is turned OFF. Although only illustrated when respect to a single module in FIG. 1, many modules on the CAN may be placed in the "sleep" mode thus multiplying the quiescent current drain by the number of modules. This is especially important when the vehicle is turned OFF, because this current drain will come from the vehicle's battery.

While in the sleep mode, the circuit needs to be able to detect the presence of a differential signal on the CAN bus and to wake the circuits out of the "sleep" mode so that the circuit can respond, if the message is addressed to it. Thus, while the circuit must draw as little current as possible in the "sleep" mode, it must still be able to detect signals on the CAN bus.

Circuits on a CAN bus must be able to withstand voltages much higher than the signal voltage and have a high common mode signal rejection. Thus, there is a need for a wake-up circuit for a circuit on the CAN bus which can meet these requirements while still requiring a very low current drain in the "sleep" mode.

SUMMARY OF THE INVENTION

It is the general object of the invention to provide a wake-up detector for a ECU on a CAN. This and other objects and features are provided by a wake-up detector for an electronic control unit (ECU) on an controller area network (CAN). A first transistor of a first type conductivity has a gate electrode coupled to an input terminal for a CANH conductor of a CAN bus. A second transistor of a second type conductivity has a gate electrode coupled to an input terminal for a CANL conductor of a CAN bus. A first current mirror circuit is coupled to a source-drain path of the first transistor and has an output coupled to a first constant current source. A second current mirror circuit is coupled to a source-drain path of the second transistor and has an output coupled to a second constant current source. A first detector circuit is coupled to a first junction of the first current mirror circuit and the first constant current source. A second detector circuit is coupled to a second junction of the second current mirror circuit and the second constant current source. An OR gate is coupled to an output of the first and second detectors and generates a wake up signal.

Another aspect of the invention comprises a wake-up detector for a physical layer of the ECU on a controller area network (CAN) having a plurality of electronic control units (ECU) coupled to a bus. A NMOS transistor has a gate electrode coupled to an input terminal for a CANH conductor of a CAN bus. A PMOS transistor has a gate electrode coupled to an input terminal for a CANL conductor of a CAN bus. A first current mirror circuit is coupled to a source-drain path of the NMOS transistor and having an output coupled to a first constant current source, the first constant current source comprising a third current mirror circuit coupled between the first junction and a first voltage source. A second current mirror circuit is coupled to a source-drain path of the PMOS transistor and having an output coupled to a second constant current source, the second constant current source comprising a fourth current mirror circuit coupled between the second junction and a second voltage source. A first Schmitt trigger circuit is coupled to a first junction of the first current mirror circuit and the first constant current source. A second Schmitt trigger circuit is coupled to a second junction of the second current mirror circuit and the second constant current source. An OR gate is coupled to an output of the first and second Schmitt trigger circuits and generates a wake-up signal.

A further aspect of the invention includes a method for detecting a signal on a controller area network (CAN) bus for waking-up electronic control unit (ECU) coupled to the bus. A CANH conductor of the CAN bus is coupled to a first transistor of the CAN bus to a first transistor of the first type. A CANL conductor of the CAN bus to a second transistor of a second type. An output of the first transistor is coupled to a first current mirror circuit and an output of the second transistor to a second current mirror circuit, the current mirror circuits mirroring current in source-drain paths of the of the respective transistors. An output of the first current mirror circuit is compared to a first constant current source. An output of the second current mirror circuit is compared to a second constant current source. A wake-up signal is generated if either comparing step equals or exceeds a predetermined level.

DETAILED DESCRIPTION OF THE PRESENT INVENTION

Figure 1:
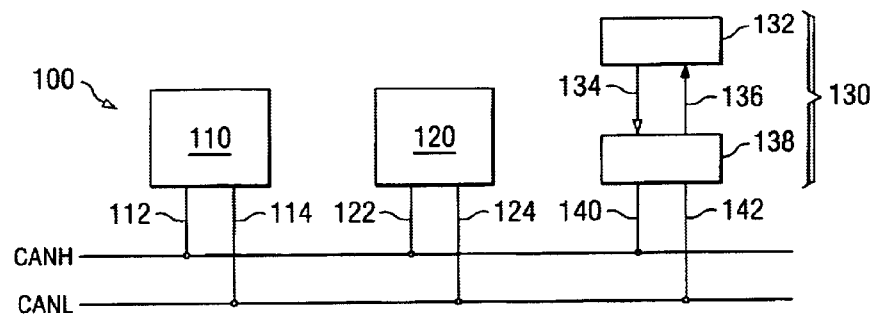
FIG. 1 is a simplified block diagram of a CAN bus.
Figure 2:
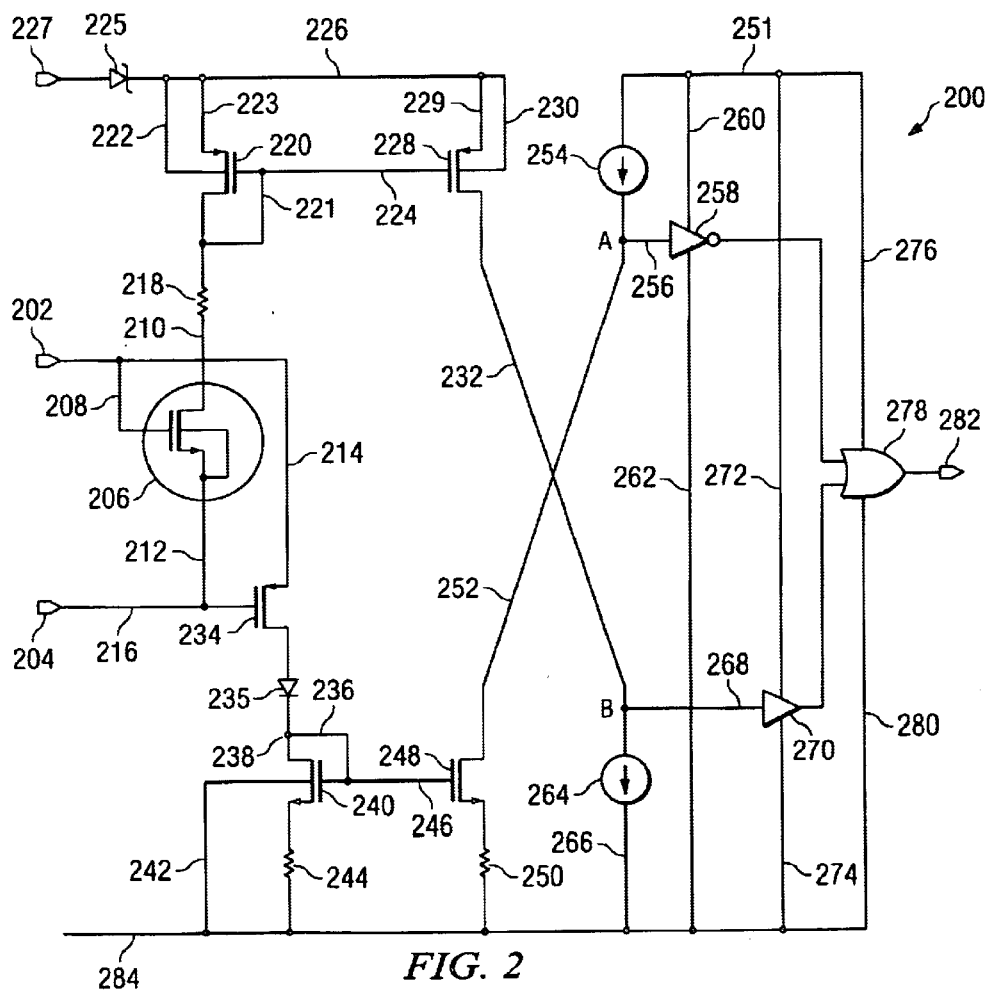
FIG. 2 is a schematic diagram illustrating an embodiment of the present invention.

Referring to FIG. 2, a schematic diagram of a wake-up circuit according to the present invention is generally shown as 200. In the wake-up circuit 200, a CANH conductor from a CAN bus is coupled to terminal 202 and a CANL conductor of the CAN bus is coupled to terminal 204. Terminal 202 is coupled via line 208 to the gate of an isolated NMOS transistor 206. The input terminal 202 is also connected via conductor 214 to the source of a transistor 234. The gate of transistor 234 is connected to the CANL input terminal 204 via conductor 216. The source of transistor 206 is connected via line 212 to line 216 coupled to the gate of transistor 234. The drain of transistor 206 is coupled via resistor 218 to diode connected PMOS transistor 220. The source of transistor 220 is connected to a power supply rail 226 and the drain of transistor 220 is connected to resistor 218. Power supply rail 226 is connected to a voltage source at terminal 227 via diode 225. Line 221 connects the gate and drain of transistor 220 together to form a diode and the back gate is connected via line 222 to the voltage rail 226. The gate of PMOS transistor 220 is connected to the gate of PMOS transistor 228 via line 224. The source of transistor to 228 is connected to the voltage rail by line 229 and the back gate is connected to the voltage rail by line 230.

The drain of transistor 234 connected to diode 235 and via line 238 to the drain of NMOS transistor 240. The source transistor 240 is connected to resistor 244 which is also connected to the reference potential 284. The back gate of transistor 240 is connected via line 242 to the reference potential 284. The gate and drain of transistor 240 is connected together via line 236. The gate of transistor 240 is connected to the gate of NMOS transistor 248 via line 246. The source of transistor 248 is connected via resistor 250 to the reference potential 284. The drain of transistor 248 is connected via line 252 to junction A. The drain of transistor 228 is coupled via line 232 to junction B.

The circuitry of the second portion of the circuit of FIG. 2 is coupled to a voltage rail 251, which may not be at the same potential as voltage rail 226. A constant current source 254 is coupled between voltage rail 251 and the junction A. The junction A is connected via line 256 to comparator 258 which is connected via line 262 voltage rail 251 and via line 262 to reference potential 284. A constant current source 264 is connected between the junction B and the reference potential 284 via conductor 266. Junction B is connected via line 268 the input of comparator 270, which is connected by line 272 to the voltage rail 251 and by line 274 to the reference potential 284. Comparator 258 has an inverting output, whereas comparator 270 does not. The first and second comparators may comprise Schmitt triggers, for example. The output of comparators 258 and 270 are coupled via lines 259 and 271, respectively to the input of two input OR gate 278. OR gate 278 is connected to the voltage rail 251 via line 276 and the reference potential 284 via line 280. The output of OR gate 278 is the wake-up signal at terminal 282.

The voltage supply supplied to rail 226 is determined by the voltage needed to provide the necessary swings in the analog components coupled thereto. The voltage supplied to voltage rail 251 is determined by the voltage of the microprocessor to which the reference signal at terminal 282 will be coupled. The voltage rail may be at 5.0 volts, for example whereas the microprocessor may be operating at 3.3 volts, for example. Thus voltage rail 251 would be at 3.3 volts and rail 226 at 5.0 volts. In this case, the comparators 258 and 270 also perform the level shifting function. However, it should be noted, that, in certain circuit configurations, the voltages on rail 226 and 251 could be identical.

In operation, one of the two complementary switching transistors 206 and 234 will turn ON when there is a differential voltage between CANH and CANL greater than the $V_{gs}$ of either device. The current flowing through resistor 218 and thus through transistor 220 will be mirrored in transistor 228 at junction B. The current source 264 will tend to pull the voltage at junction B down whereas the current mirrored through transistor 228 will tend to pull the voltage at junction B up. If the current flowing through transistor 228 exceeds the current of current source 264, the voltage of junction B will be pulled up and trigger the comparator or Schmitt trigger 270.

The current flowing through transistor 234 will pass through diode-connected transistor 240 into resistor 244 and to ground. This current will be mirrored by transistor 248 which will draw current from junction A. Constant current source 254 will supply current to junction A. Thus, if the current drawn from junction A is less than the current supplied by constant current source 254, then the voltage at junction A will increase at trigger comparator or Schmitt trigger 268.

The inverted output of comparator 258 and the output of comparator 270 are combined by OR gate 278 to generate a wake-up signal at terminal 282.

As is well known to those skilled in the art, a CAN bus according to the International Standard utilizes a voltage which exceeds a threshold to indicate a dominant bit and the voltage which is below a set threshold to indicate a recessive bit. If a dominant bit is supplied across terminal 202, 204, then transistor 206 will be turned ON and transistor 234 will be turned OFF. This current will flow through transistor 220 and be mirrored in transistor 228 driving junction B high, triggering comparator 270 and providing a "1" bit into OR gate 278. Transistor 234 will be turned OFF, so that no current will flow into transistor 238. Therefore, no current will flow through mirror transistor 248 and junction A will be pulled high by constant current source 254. This will the trigger the comparator 258, causing the inverted output to be low, and thus not provide a "1" to the OR gate 278.

However, operation over a wide common mode voltage range is required on a CAN bus. If the common mode voltage is positive and above the voltage rail 226, at 10 volts, for example, and CANH switches to 11 volts, both switching transistors 206, 234 will turn ON. However, current will only flow through current mirror 238, 248 to activate comparator or Schmitt trigger 258.

If the common mode voltage is negative, the reverse is true. If the common mode voltage is −10 volts and CANH switches to −9 volts, the current mirror 220, 230 will mirror current to switch comparator or Schmitt trigger 270. Diode 235 prevents current from flowing from ground to CANH.

In either case, the presence of a signal across the CAN bus on terminal 202, 204 will trigger a wake-up signal at terminal 282.

Figure 3:
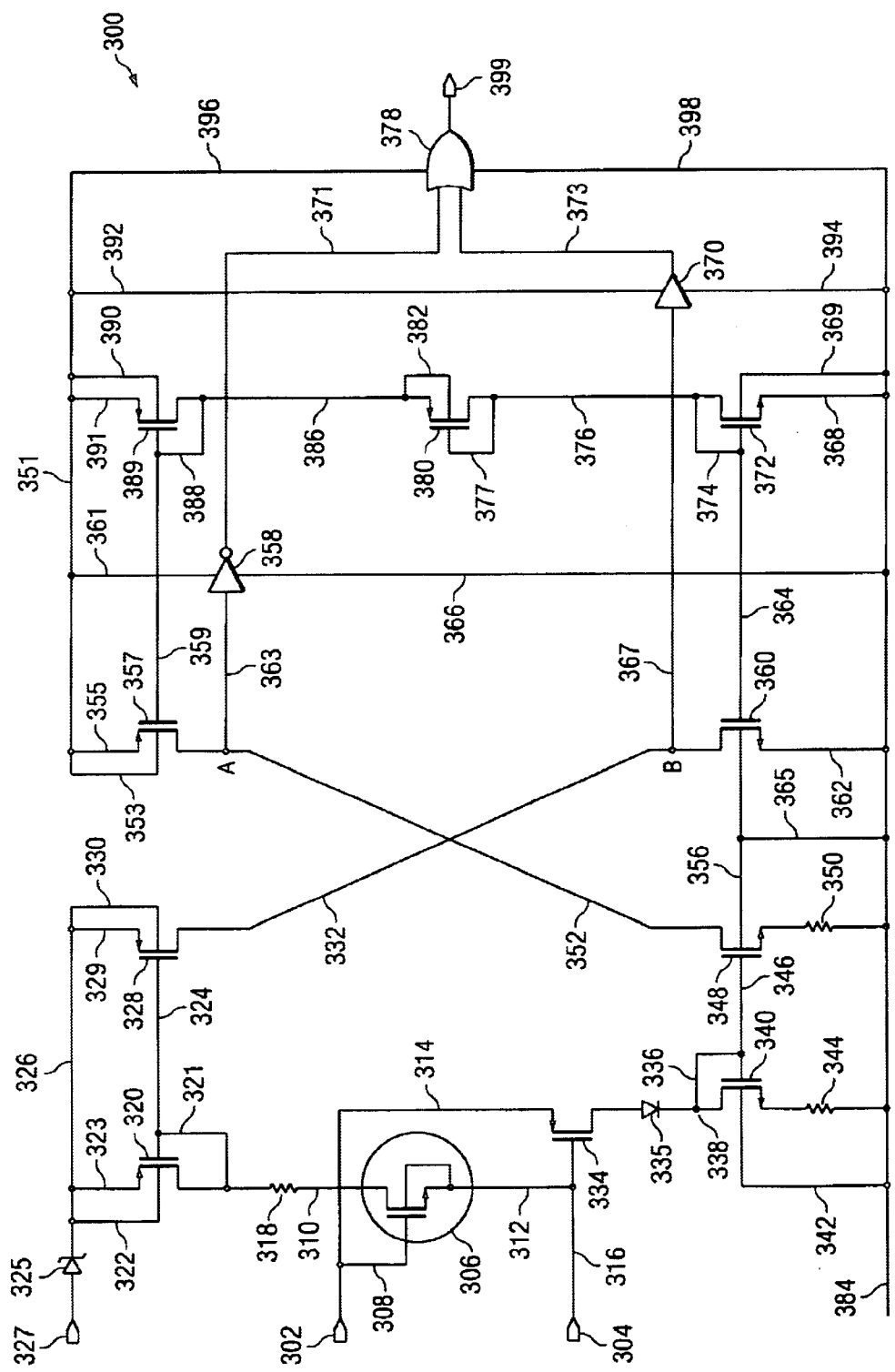
FIG. 3 is a schematic diagram showing another embodiment of the present invention.

Referring to FIG. 3, a schematic diagram of a wake-up detector according to a another embodiment of the present invention is shown generally as 300. The CANH signal is supplied to terminal 302 which is coupled via line 308 to the gate of an isolated NMOS transistor 306. The CANH signal is also coupled via line 314 to the source of PMOS transistor 334. The CANL signal is applied to terminal 304 and via line 316 to the gate of PMOS transistor 334. The CANL signal is also applied via line 312 to the source of NMOS transistor 306. The drain of transistor 306 is coupled via line 310 to resistor 318 and from resistor 318 to the drain of transistor 320. The source of transistor 320 is coupled via line 323 to voltage rail 326. Power supply rail 326 is connected to a voltage source at terminal 327 via diode 325. The back gate of transistor 320 is coupled via line 322 to voltage rail 326. The gate of transistor 320 is coupled via line 321 to the drain thereof. The gate of transistor 320 is also coupled via line 324 to the gate of PMOS transistor 328. The source of transistor 328 is coupled via line 329 to the voltage rail 326. The back gate of transistor 328 coupled via line 330 to the voltage rail 326. The drain of transistor 328 is coupled via line 332 to a junction B.

The drain of transistor 334 is coupled via line 338 to diode 335 which is coupled to the drain of transistor NMOS transistor 340. The drain of transistor 340 is also coupled via line 336 to the gate thereof. Resistor 344 is coupled between the source of transistor 340 and the reference potential 384. The back gate of transistor 340 is coupled via line 342 to the reference potential 384. The gate of transistor 340 is also coupled via line 346 to the gate of NMOS transistor 348. Resistor 350 coupled between the source of transistor 348 and the reference potential. The source of transistor 348 is coupled via line 352 to the junction A. The back gate of transistor 348 is coupled via line 356 and line 365 to the reference potential. The circuitry of FIG. 3 described so far utilizes power supplied at voltage rail 326 and reference voltage 384. In a preferred embodiment of the present invention, the voltage rail 326 is at 5.0 volts and the voltage reference 384 is at ground potential.

Transistor 357 has its drain coupled to the junction A and its source coupled to the voltage rail 351 by line 355. The back gate of this transistor is coupled to the voltage rail 351 by line 353. The gate of transistor 357 is connected to the gate of transistor 389 by line 359. The source of transistor 389 is connected via line 391 to the voltage rail 351 and the back gate of the transistor is connected to voltage rail 351 via line 390. The gate of transistor 389 is connected to the drain thereof via line 388. The drain of transistor 389 is connected via line 386 to the source of diode connected PMOS transistor 380. The gate of transistor 380 is connected to the drain thereof via line 377 and the back gate is connected to the source via line 382. The drain of transistor 380 is connected via line 376 to the drain of NMOS transistor 372. The gate of transistor 372 is connected to the drain thereof via line 374. The back gate is connected to the reference potential 384 via line 369 and the source is connected to reference potential 384 via line 368. The gate of transistor 372 is connected to the gate of transistor 360. The drain of transistor 360 is connected to the junction B. The source of transistor 360 is connected to the reference potential 384 via line 362. The back gate of transistor 360 is connected to the reference potential via lines 356 and 365. The junction A is connected to comparator 358 via line 363. Comparator 358 may be a Schmitt trigger, for example, and has an inverting output on line 371. Junction B is connected via line 367 to comparator 370, which may be a Schmitt trigger, for example, and has an uninverted output on line 373. Lines 371 and 373 are the inputs to the two input OR gate 378. The output of OR gate 378 is the wake-up signal on terminal 399.

In a preferred embodiment of the present invention, voltage rail 351 is 3.3 volts and the output wake-up signal on terminal 399 is at 3.3 volts. Thus, comparators 368 and 370 and OR gate 378 are coupled to the voltage rail 351 via lines 361, 392, and 396, respectively and are coupled to the reference supply 384 via lines 366, 394, 398 respectively. The comparators 358 and 370 in this embodiment also perform a level shifting function. In this case, the microprocessor operates at 3.3 volts and the logic signals received by and sent from the microprocessor will be at this voltage. However, in the case where the microprocessor operates at the same voltage as the analog portion of the physical layer, the voltage rails 326 and 351 can be at the same voltage.

In operation, transistor 380 is configured to operate as a constant current source. In a preferred embodiment of the present invention, the current generated by this constant current source is one microampere, for example. This current also flows through transistors 389 and 372. Transistor 389 is in a current mirror configuration with transistor 357. Thus, the current flowing in transistor 389, which is the same as the current flowing in transistor 380, also flows in transistor 357. Those skilled in the art know that it is possible to change the proportion of the current flowing in transistor 357 from a 1 to 1 correspondence with the current flowing in transistor 389 by varying the width and length of the transistors. The current provided by transistor 357 is supplied to junction A. Similarly, transistors 372 and 360 are in a current mirror configuration. Thus, the current flowing in transistor 372 will also flow in transistor 360, assuming a 1 to 1 correspondence between the current in both transistors as discussed above. This current will also be the current that flows in transistor 380. The current in transistor 360 will be drawn from junction B.

When a dominant signal is applied to terminal 302, it will turn on transistor 306, which will draw current through transistor 320. Transistors 320 and 328 are in a current mirror configuration. Thus, the current flowing in transistor 320 will be replicated in transistor 328, assuming a 1 to 1 correspondence of a current mirror configuration, as discussed above. This current will be provided to junction B. The high level signal will attempt to turn OFF transistor 334 so that little or no current will be provided to junction A. The current generated by current mirror circuit containing transistor 320 and 328 is chosen to slightly exceed the current through transistor 360 when a dominant signal is applied, thus pulling junction B high and triggering the comparator or Schmitt trigger 370. This generates a logical 1 on line 373 which provided a logical zero at terminal 399 as a wake-up signal.

The circuit 300 can handle wide common mode voltages as described with respect to the circuit 200. If the common mode voltage is positive and above the voltage rail 326, at 10 volts, for example, and CANH switches to 11 volts, both switching transistors 306, 324 will turn ON. However, current will only flow through current mirror 338, 348 to activate comparator or Schmitt trigger 358.

If the common mode voltage is negative, the reverse is true. If the common mode voltage is −10 volts and CANH switches to −9 volts, the current mirror 220, 230 will mirror current to switch comparator or Schmitt trigger 370. Diode 335 prevents current from flowing from ground to CANH.

In either case a low signal is generated at terminal 399 as a wake-up signal. Thus, regardless of the common mode voltage, when a dominant signal is applied to the CAN bus, a wake-up signal will be generated at terminal 399 to which will activate the ECU so that it can process the incoming signal to determine if it needs to respond.

The circuits as shown, utilizing a current source through transistor 380 of one microampere, can meet the requirements of a CAN system with respect to voltage threshold, current load rejection and draw with less than 10 microamperes from the power source. It should be noted that the protector circuits used to protect the circuits from excessive voltages have been omitted for clarity.

While the invention has been particularly shown and described with reference to preferred embodiments thereof, it is well understood by those skilled in the art that various changes and modifications can be made in the invention without departing from the spirit and scope of the invention as defined by the appended claims.

What is claimed is:

1. A wake-up detector for an electronic control unit (ECU) on a controller area network (CAN) bus comprising:
    a first transistor of a first conductivity type having a gate electrode coupled to an input terminal for a CANH conductor of the CAN bus;
    a second transistor of a second conductivity type having a gate electrode coupled to an input terminal for a CANL conductor of the CAN bus;
    a first current mirror circuit coupled to a source-drain path of the first transistor and having an output coupled to a first constant current source;
    a second current mirror circuit coupled to a source-drain path of the second transistor and having an output coupled to a second constant current source;
    a first detector circuit coupled to a first junction of the first current mirror circuit and the first constant current source;
    a second detector circuit coupled to a second junction of the second current mirror circuit and the second constant current source;
    an OR gate coupled to an output of the first and second detector circuits and generating a wake up signal.

2. The wake-up detector of claim 1 wherein the first and second detector circuits comprise Schmitt trigger circuits.

3. The wake-up detector of claim 1 wherein the first constant current source comprises a third current mirror circuit coupled between the first junction and a first voltage source; and
    the second constant current source comprises a fourth current mirror circuit coupled between the second junction and a second voltage source.

4. The wake-up detector of claim 2 wherein the first constant current source comprises a third current mirror circuit coupled between the first junction and a first voltage source; and
    the second constant current source comprises a fourth current mirror circuit coupled between the second junction and a second voltage source.

5. The wake-up detector of claim 3 further comprising a third constant current source coupled between the third and fourth current mirror circuits for generating a fixed current into one leg of each of the third and fourth current mirror circuits.

6. The wake-up detector of claim 4 further comprising a third constant current source coupled between the third and fourth current mirror circuits for generating a fixed current into one leg of each of the third and fourth current mirror circuits.

7. The wake-up detector of claim 5 wherein the first voltage source is a reference voltage and the second voltage source is a supply voltage.

8. The wake-up detector of claim 6 wherein the first voltage source is a reference voltage and the second voltage source is a supply voltage.

9. The wake-up detector of claim 7 wherein the second voltage source is different from a voltage source for the first and second transistors and the first and second current mirror circuits and wherein the first and second detector circuits include level shifter circuits.

10. The wake-up detector of claim 2 wherein the second voltage source is different from a voltage source for the first and second transistors and the first and second current mirror circuits and wherein the first and second detector circuits include level shifter circuits.

11. The wake-up detector of claim 1 wherein the first transistor is an isolated NMOS transistor and the second transistor is a PMOS transistor.

12. The wake-up detector of claim 2 wherein the first transistor is an isolated NMOS transistor and the second transistor is a PMOS transistor.

13. In a controller area network (CAN) having a plurality of electronic control units (ECU) coupled to a CAN bus, a wake-up detector for a physical layer of an ECU comprising:
    an NMOS transistor having a gate electrode coupled to an input terminal for a CANH conductor of the CAN bus;
    a PMOS transistor having a gate electrode coupled to an input terminal for a CANL conductor of the CAN bus;
    a first current mirror circuit coupled to a source-drain path of the NMOS transistor and having an output coupled to a first constant current source, the first constant current source comprising a third current mirror circuit coupled between a first junction and a first voltage source;
    a second current mirror circuit coupled to a source-drain path of the PMOS transistor and having an output coupled to a second constant current source, the second constant current source comprising a fourth current mirror circuit coupled between a second junction and a second voltage source;
    a first Schmitt trigger circuit coupled to a first junction of the first current mirror circuit and the first constant current source;
    a second Schmitt trigger circuit coupled to a second junction of the second current mirror circuit and the second constant current source;
    an OR gate coupled to an output of the first and second Schmitt trigger circuits and generating a wake-up signal.

14. A method for detecting a signal on a controller area network (CAN) bus for waking-up electronic control unit (ECU) coupled to the CAN bus comprising:
    coupling a CANH conductor of the CAN bus to a first transistor of the first conductivity type;
    coupling a CANL conductor of the CAN bus to a second transistor of a second conductivity type;
    coupling an output of the first transistor to a first current mirror circuit and an output of the second transistor to a second current mirror circuit, the current mirror circuits mirroring current in source-drain paths of the of the respective transistors;
    comparing an output of the first current mirror circuit to a first constant current source to generate a first comparator signal;

comparing an output of the second current mirror circuit to a second constant current source to generate a second comparator signal; and generating a wake-up signal if either of the first or the second comparator signals equals or exceeds a predetermined level.

15. The method of claim 14 wherein the output of the first current mirror is compared to an output of a third current mirror circuit, the third current mirror circuit forming the first constant current source, and wherein the output of the second current mirror circuit is compared to an output of a fourth current mirror circuit, the fourth current mirror circuit forming the second constant current source.

16. The method of claim 14 wherein the wake-up signal is at a different voltage level than input signals CANH and CANL.

* * * * *